United States Patent [19]
Takekoshi et al.

[11] 3,917,643
[45] Nov. 4, 1975

[54] METHOD FOR MAKING POLYETHERIMIDES AND PRODUCTS PRODUCED THEREBY

[75] Inventors: Tohru Takekoshi, Scotia, N.Y.; John E. Kochanowski, Pittsfield, Mass.

[73] Assignee: General Electric Company, Schenectady, N.Y.

[22] Filed: June 22, 1973

[21] Appl. No.: 372,769

[52] U.S. Cl. ...... 260/326 R; 260/326 S; 260/326 A; 117/31
[51] Int. Cl.² ........................................ C07D 209/34
[58] Field of Search.......... 260/326 S, 326 R, 326 A

[56] References Cited
UNITED STATES PATENTS
3,622,514  11/1971  Dickert, Jr. ..................... 260/326 S
3,699,075  10/1972  Lubowitz ............................. 260/49
3,714,151   1/1973  Lyness ............................. 260/326 S
3,746,721   7/1973  Stephan ........................... 260/326 S
3,868,388   2/1975  Datson, Jr. et al. ............ 260/326 N Primary Examiner—Elbert L. Roberts
Attorney, Agent, or Firm—William A. Teoli; Joseph T. Cohen; Jerome C. Squillaro

[57] ABSTRACT

A method is provided for making polyetherimides involving the reaction of aromatic bis(ether anhydride)s and organic diamines in the presence of a phenolic solvent. The resulting polyetherimide-phenolic solvent mixture can be employed as a wire coating enamel.

6 Claims, No Drawings

METHOD FOR MAKING POLYETHERIMIDES AND PRODUCTS PRODUCED THEREBY

The present invention relates to polyetherimides which can be made by effecting reaction between an aromatic bis(ether anhydride) and an organic diamine in a phenolic solvent.

Prior to the present invention, polyimides derived from the reaction of organic dianhydrides and organic diamines were generally thermoset and made by producing an intermediate polyamide acid. As shown by Edwards U.S. Pat. No. 3,179,614, the polyamide acid is preferably obtained by reacting the organic dianhydride and the organic diamine with a dipolar aprotic solvent at temperatures of 50°C or below. One of the reasons for careful temperature control is that premature formation of water of reaction leads to depolymerization of polymer. In addition, imidization occurs as soon as the temperature exceeds optimum limits which can decrease polymer solubility and solution shelf life.

As shown by our copending application Ser. No. 319,371, filed Dec. 29, 1972, and assigned to the same assignee as the present invention, certain polyimides, such as polyetherimides can be made by effecting reaction between an aromatic bis(ether anhydride) and an organic diamine in the presence of an inert organic solvent such as orthodichlorobenzene at temperatures of at least 130°C. Although polyetherimides can be made at elevated temperatures, often a plural phase mixture of inert organic solvent and polyetherimide results, particularly when the reaction mixture is allowed to cool to room temperature. In addition, the water of reaction and the immiscible ortho-dichlorobenzene can cause foaming and complicate recovery of the polyetherimide. As a result, an added separation step is required before the polyetherimide can be used if the high temperature method is employed.

The present invention is based on the discovery that reaction between substantially equal molar amounts of aromatic bis(ether anhydride)s of the formula,

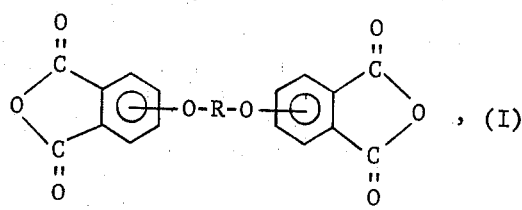

and organic diamine of the formula, $$H_2NR^1NH_2 \quad (II)$$

in the presence of a phenolic solvent produces a solution which remains homogeneous when the mixture is allowed to cool to room temperature. There is obtained a solution of polyetherimide in the phenolic solvent which can be used directly as a wire coating enamel or for applying polyetherimide onto various substrates. If desired, the polyetherimide can be recovered by effecting its separation from the phenolic solvent mixture with a non-solvent for polyetherimide, such as methanol.

As shown in formula I, R is a member selected from the class consisting of (a) the following divalent organic radicals:

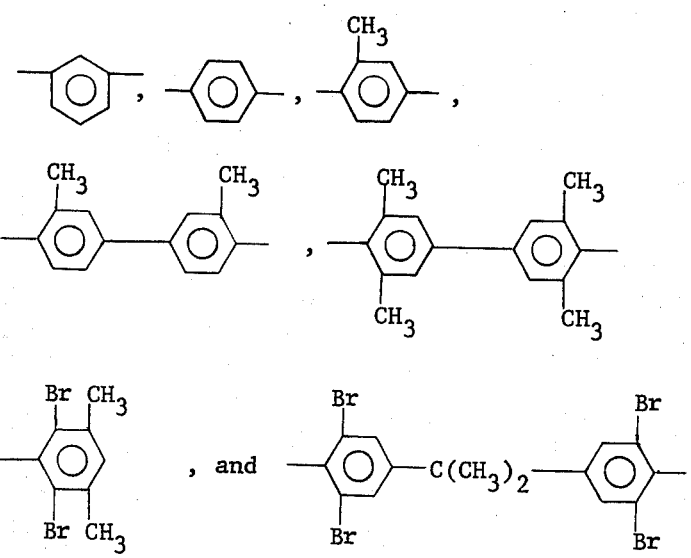

and (b) divalent organic radicals of the general formula

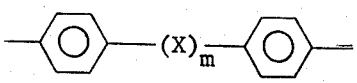

where X is a member selected from the class consisting of divalent radicals of the formulas

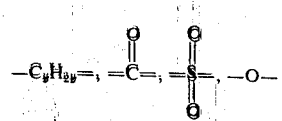

and —S—, where $m$ is 0 or 1, $y$ is a whole number from 1 to 5, and $R^1$ is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula,

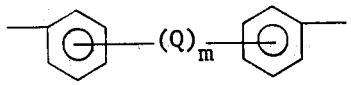

where Q is a member selected from the class consisting of

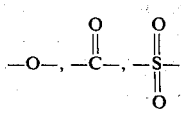

and $x$ is a whole number from 1 to 5 inclusive, and $m$ is as previously defined.

There is provided by the present invention, a method for making a polyetherimide, which comprises, (1) effecting reaction between aromatic bis(ether anhydride) of formula I and organic diamine of formula II, in the presence of a phenolic solvent at temperatures between about 100°C to 250°C while effecting the removal of water of reaction, (2) separating said polyetherimide from the resulting mixture of (1).

There is also provided by the present invention, a wire coating enamel having a viscosity of from 200 to 2000 centipoises at 25°C, comprising a solution of polyetherimide in a phenolic solvent, where the polyetherimide consists essentially of from 2 to 500, and preferably from 10 to 200 of chemically combined units of the formula,

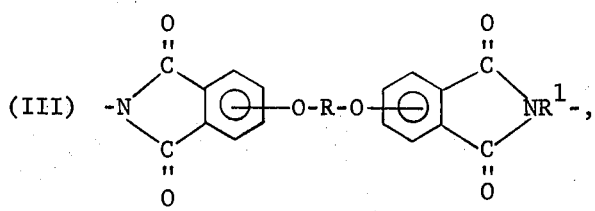

where R and $R^1$ are as previously defined. As used above, and hereinafter, the term "phenolic solvent" includes phenol and mixtures of o-, p- and m-cresols known as cresylic acid and mixtures of cresylic with phenol. In addition phenolic solvent also includes ethylphenols, isopropylphenols, ter-butylphenols, xylenols, chlorophenols, dichlorophenols, phenylphenols, etc. The wire coating enamels of the present invention can have from 1 to 40 parts of polyetherimide, per 100 parts of phenolic solvent.

Included by the aromatic bis(ether anhydride)s of formula I are compounds having the formulas,

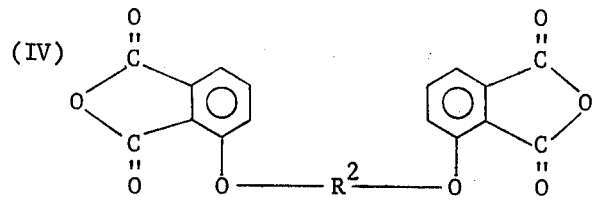

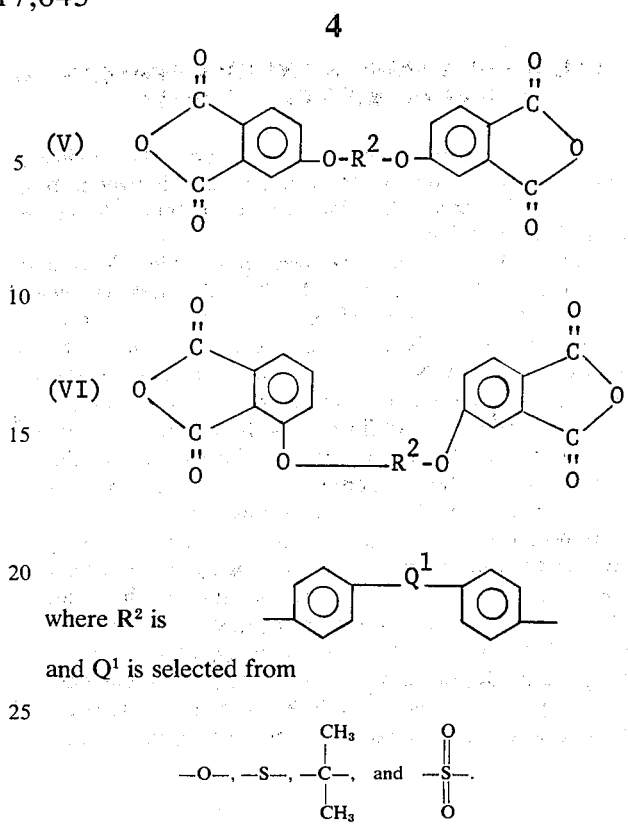

where $R^2$ is and $Q^1$ is selected from

Dianhydrides included by formula IV are, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis (2,3-dicarboxyphenoxy)diphenylsulfone dianhydride.

Dianhydrides included by formulas V and VI are, for example, 2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'(3,4-dicarboxyphenoxy)diphenyl-2,2-propane dianhydride, etc.

In addition to formulas IV-V above, aromatic bis(ether anhydride)s also included by formula I are shown by Koton, M. M.; Florinski, F. S.; Bessonov, M. I.; Rudakov, A. P. (Institute of Heteroorganic Compounds, Academy of Sciences, USSR) USSR 257,010, Nov. 11, 1969, Appl. May 3, 1967. In addition dianhydrides shown M.M. Koton, F.S. Florinski, Zh Org. Khin 4(5) 774 (1968).

Some of the aromatic bis(ether anhydride)s of formula I are shown in copending application of Darrell Heath and Joseph Wirth, Ser. No. 281,749, filed Aug. 18, 1972, and assigned to the same assignee as the present invention. These dianhydrides can be prepared from the hydrolysis, followed by dehydration, of the reaction product of a nitro-substituted phenyl dinitrile with a metal salt of a dihydric phenol compound in the presence of a dipolar aprotic solvent. For example, a benzenoid compound of the formula,

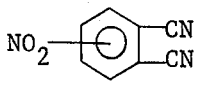

where the $NO_2$ group can be positioned anywhere in the benzene ring, can be reacted in dimethylformamide with an alkali metal salt of a dihydric phenol of the general formula, Alk-O-$R^2$-O-Alk where $R^2$ is a divalent aromatic radical and Alk is an alkali metal ion. Various well known procedures can be used to convert the resulting tetranitriles to the corresponding tetra-acids and dianhydrides.

Included by the alkali metal salts of the above described dihydric phenols are sodium and potassium salts of the following dihydric phenols:

2,2-bis(2-hydroxyphenyl)propane;
2,4'-dihydroxydiphenylmethane;
bis(2-hydroxyphenyl)methane;
2,2-bis(4-hydroxyphenyl)propane hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
3,4'-dihydroxydiphenylmethane;
4,4'-dihydroxybenzophenone;
4,4'-dihydroxydiphenyl ether;
hydroquinone;
resorcinol, etc.

Included by the organic diamines of formula II, are, for example,
m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
4,4'-diaminobenzophenone;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

The polyetherimide reaction products can be reinforced with conventional silica fillers, for example, perlite, fume silica, etc., carbon whiskers, glass fibers, etc. at proportions of from 10 to 60 parts of filler, per 100 parts of polyetherimide.

In the practice of the method of invention, reaction is effected between the aromatic bis(ether anhydride)s and the organic diamines in the presence of a phenolic solvent.

The order of addition of either reactants is not critical. It is preferred to effect the reaction of the dianhydride and the organic diamine in an inert atmosphere such as nitrogen. Experience has shown that sufficient phenolic solvent should be utilized to provide a solids content in the range of about 10% to 50%.

Reaction can be effected at a temperature of from 100°C to 250°C, and preferably 130°C to 200°C.

In order to provide optimum contact between the aromatic bis(ether anhydride) and the organic diamine, the reaction mixture can be agitated such as by stirring, etc. Substantially equal moles of reactants has been found to provide for optimum molecular weight of polymer; however, there can be employed from 0.5 to 2 moles and preferably 0.9 to 1.1 moles of aromatic bis(ether anhydride) per mole of organic diamines for effective results. It has been found that the polyetherimide can have from about 5 to 500 repeating aromatic bis(ether anhydride)-organic diamine reaction product units and preferably 10 to 200. Terminal amino and phthalic acid or phthalic anhydride end groups can be present.

Reaction time of the bis(ether anhydride) of formula I and the organic diamine of formula II can vary from 0.5 to 20 hours depending upon such factors as the temperature employed, degree of stirring, nature of the reactants, etc.

During the course of polymer formation, water of reaction is continuously removed. The course of the reaction can be readily determined by the actual amount of water generated, as a percentage of the theoretical. In particular instances, a mixed solvent system can be employed consisting of a phenolic solvent and a low boiling solvent which forms an azeotropic mixture with water. The low boiling solvents such as cyclohexane benzene, toluene, chlorobenzene, etc. can be used.

At the termination of the reaction, recovery of polyetherimide can be effected by pouring the polymer solution upon cooling into a precipitant such as methanol, etc., followed by washing, filtering, etc.

In order that those skilled in the art will be able to practice the invention, the following examples are given by way of illustration and not by way of limita-

EXAMPLE 1

A mixture of 2.011 parts of 1,4-bis(2,3-dicarboxyphenoxy)benzene dianhydride and 0.991 part of 4,4'-diaminodiphenylmethane and about 30 parts of trichlorobenzene was heated to reflux for one hour. During the time the mixture was heated, water was continuously removed by azeotropic distillation. Polymer formed during the period of reaction remained insoluble even though the temperature of the mixture was as high as 230°C.

EXAMPLE 2

A mixture of 3 parts of 2,2-bis[4-(2,3-dicarboxyphenoxy)phenyl]propane dianhydride and 1.152 parts of 4,4'-diaminodiphenyl ether, about 40 parts of phenol and 10 parts of toluene were heated to reflux for 4½ hours. During this period water was continuously azeotroped from the mixture. The mixture was then allowed to cool to room temperature. There was obtained a solution of polyetherimide consisting essentially of repeating units of the formula,

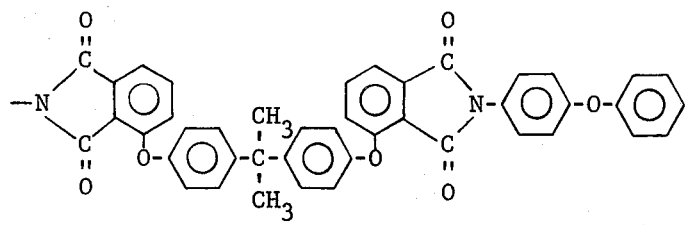

The above reaction mixture was then allowed to cool to room temperature and about 5 parts of meta-cresol and 2 parts of toluene were added. The mixture was reheated to reflux. An additional amount of water was rapidly formed and the polymer formed during the reaction completely dissolved. The mixture was allowed to cool to room temperature and a viscous polymer solution was obtained. Based on method of preparation the product was a solution of a polyetherimide. A titer of the solution was poured into methanol to effect the precipitation of product. There was obtained a light yellow fibrous polyetherimide at a yield of about 92.5%. Anal. Calc. for $C_{35}H_{20}N_2O_6$; C, 74.46; H, 3.57; N, 4.96. Found: C, 74.1; H, 3.8; N, 5.3. The polyetherimide consisted essentially of repeating units of the formula,

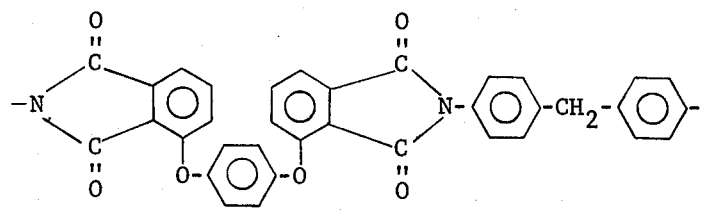

The identity of the polyetherimide was confirmed by its IR-spectrum.

A portion of the above described polyetherimide solution having a viscosity of about 900 centipoises is employed to treat a copper wire. A copper wire is passed through the polyetherimide solution and then baked for 60 minutes at 350°C. There was obtained an insulated copper conductor having valuable characteristics.

having a viscosity of about 1100 centipoises at 25°C. The identity of the product was confirmed by its IR spectrum and method of preparation. The polyetherimide was a light yellow fibrous polymer which was made at a yield of about 98.6% after a titer of the solution was precipitated in methanol.

The above polyetherimide solution is employed as a wire coating enamel as described in Example 1 to produce a coated aluminum conductor having valuable characteristics.

EXAMPLE 3

A mixture of 3.000 parts of 2,2-bis[4-(3,4-dicarboxyphenoxy)phenyl]propane dianhydride, 1.143 parts of 4,4'-diaminodiphenylmethane, about 40 parts phenol and about 10 parts toluene (10 ml) was heated to reflux at 150 to 154°C for 1.25 hours during which time the water formed was removed as an azeotrope. Upon cooling, the reaction mixture was poured into methanol to yield fibrous precipitate of the polymer. The yield was 3.67 part (93.3%). A transparent, tough film was obtained by casting from chloroform solution. The IR spectrum of the film showed that the polymer consists essentially of repeating units of the formula,

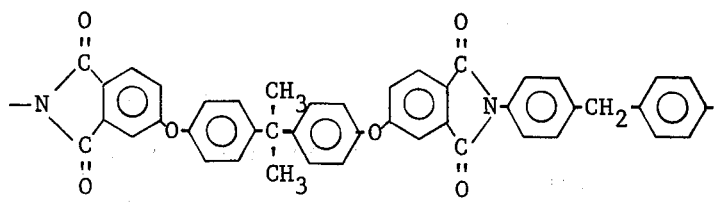

EXAMPLE 4

A mixture of 3.000 parts of 2,2-bis[4-(2,3-dicarboxyphenoxy)phenyl]propane dianhydride, 1.143 parts of 4,4'-diaminodiphenylmethane, about 10 parts of toluene and about 35 parts of technical grade cresylic acid was heated at 170°C for 2 hours, during which time the water formed was removed azeotropically. The reaction mixture was poured to precipitate fibrous polymer. The yield of the polymer was 3.87g (98.3%). The intrinsic viscosity in DMF was 0.47 dl/g. Based on method of preparation the polymer consisted of repeating units of the formula,

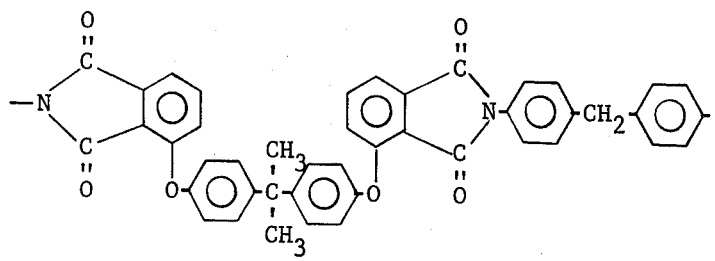

EXAMPLE 5

A mixture of 3.000 parts of 2,2-bis[4-(3,4-dicarboxyphenoxy)phenyl]propane dianhydride, 1.143 part of 4,4'-diaminodiphenylmethane, about 10 parts of toluene and about 35 parts of technical cresylic acid was heated at 160°C for 2 hours. The water formed was removed azeotropically. The polymer was precipitated in methanol, the yield was 3.78g (96.1%). Based on method of preparation and its infrared spectrum, the polymer consisted essentially of repeating units of the formula,

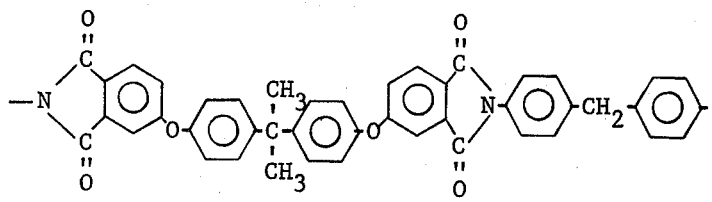

EXAMPLE 6

A mixture of 3.000 parts of 2,2-bis[4-(3,4-dicarboxyphenoxy)phenyl]propane, 1.115 parts of 4,4'-diaminodiphenyl ether, about 10 parts of toluene and about 50 parts of ortho-chlorophenol was heated to reflux at 150°C for 4 hours. The water formed during the reaction was removed by use of a modified Dean-Stark trap filled with 4A molecular sieves. A titer of the polymer was precipitated in methanol, the yield was 3.32 (89.1%). The intrinsic viscosity in DMF was 0.40 dl/g.

A copper conductor is dipped into a portion of the above phenolic solution of polyetherimide. The wire is then allowed to air dry at ambient temperature to produce a valuable insulated conductor.

EXAMPLE 7

A mixture of 6.282 parts of 4,4'-bis(2,3-dicarboxyphenoxy)diphenyl ether dianhydride, 1.374 parts of meta-phenylenediamine, 20 parts of meta-cresol and 7 parts of toluene was heated at 140°C for 20 minutes during which time water formed was removed by azeotropic distillation. The toluene was distilled off and the reaction mixture was heated at 160°C for 10 minutes. The resulting viscous solution was cooled and diluted with about 25 parts of m-cresol. The viscosity of the solution was 960 centistokes at 25°C. A titer of the solution was poured into methanol to precipitate the white fibrous polymer. The intrinsic viscosity of the polymer was 0.25 and glass transition temperature was 205°C. Anal. Calc. for $C_{34}H_{18}N_2O_7$: C, 72.08; H, 3.20; N, 4.95. Found: C, 71.9; H, 3.5; N, 5.4. Based on the method or preparation and the above analysis the polymer consists essentially of repeating units of the formula,

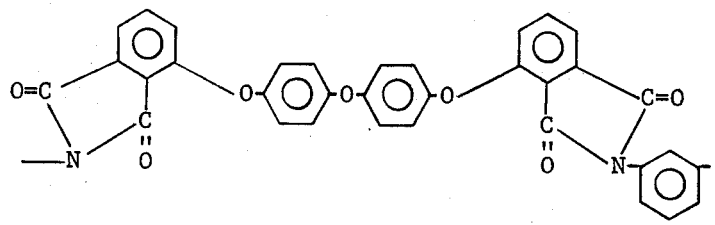

EXAMPLE 8

A mixture of 1.98 parts of 4,4'-diaminodiphenylmethane, 2.60 parts of 2,2-bis[4-(2,3-dicarboxyphenoxy)-phenyl]propane dianhydride, 2.60 parts of 2,2-bis[4-(3,4-dicarboxyphenoxy)phenyl]propane dianhydride, 40 parts of cresylic acid, and 10 parts of toluene was heated to reflux for 2 hours during which time the water formed was continuously removed azeotropically. Toluene was removed by distillation and the reaction mixture was cooled. The resulting viscous, homogeneous polymer solution had a viscosity of approximately 1,000 centistokes at 30°C. The solution is stable for indefinite time and can be used as a wire coating enamel. The titer of the solution was poured into methanol and the fibrous polymer precipitated was isolated. The polymer was identified as a polyetherimide derived from 4,4'-diaminodiphenylmethane and the above two bis(ether anhydride)s by IR and nmr spectra.

The above examples are limited to only a few of the very many polyetherimides which can be made in accordance with the invention, as well as wire coating compositions made thereby; it should be understood that the present invention is broadly directed to polyetherimides made by effecting reaction between aromatic bis(ether anhydride) of formula I and organic diamine of formula II in the presence of a phenolic solvent.

What we claim as new and desire to secure by Letters Patent of the United States is:

1. A method for making a polyetherimide, which comprises, 1. effecting reaction between aromatic bis(ether anhydride) of the formula,

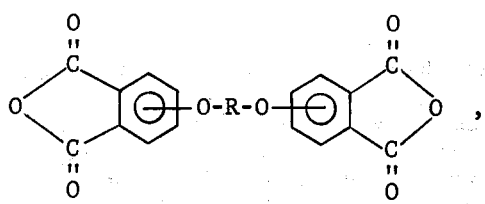

and organic diamine of the formula,
H₂NR¹NH₂,
in the presence of a phenolic solvent at temperatures between about 100°C to 250°C while effecting the removal of water of reaction, 2. separating said polyetherimide from the resulting mixture of (1), where R is selected from the class consisting of a. the following divalent organic radicals,

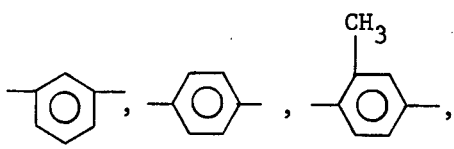

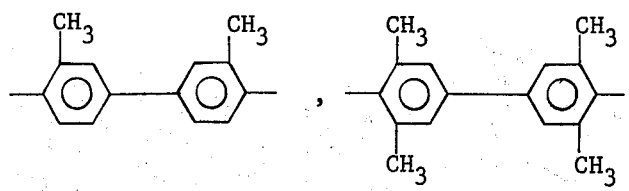

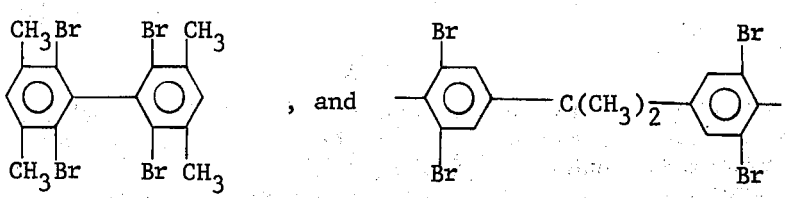

and (b) divalent organic radicals of the general formula

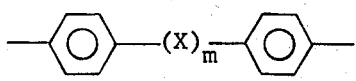

where X is a member selected from the class consisting of divalent radicals of the formulas

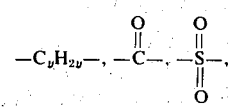

-O-, and -S-, where $m$ is 0 or 1, $y$ is a whole number from 1 to 5, and $R^1$ is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula,

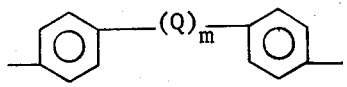

where Q is a member selected from the class consisting of

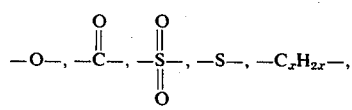

and $x$ is a whole number from 1 to 5 inclusive, and $m$ is as previously defined.

2. A method in accordance with claim 1 where the aromatic bis(ether anhydride) is

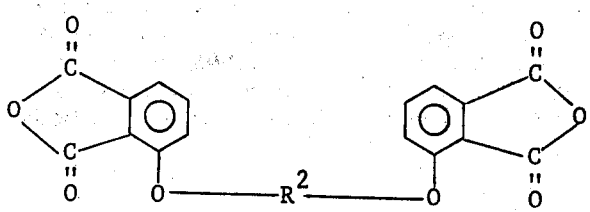

where $R^2$ is

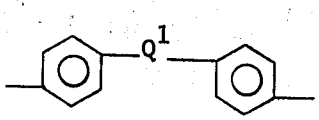

and $Q^1$ is selected from

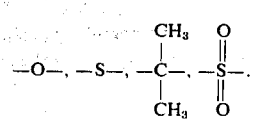

3. A method in accordance with claim 1 where the aromatic bis(ether anhydride) is

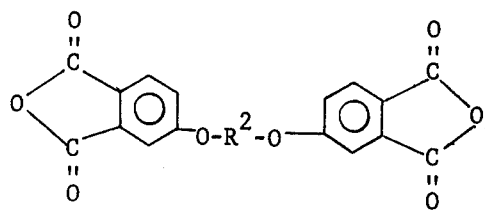

where $R^2$ is as previously defined.

4. A method in accordance with claim 1 where water of reaction is separated by the use of azeotroping organic solvent.

5. A method in accordance with claim 1 where the organic diamine is methylene dianiline.

6. A method in accordance with claim 1 where the organic diamine is oxydianiline.

* * * * *